(12) United States Patent
Struckman et al.

(10) Patent No.: US 7,358,891 B2
(45) Date of Patent: Apr. 15, 2008

(54) MULTIPATH RESOLVING CORRELATION INTERFEROMETER DIRECTION FINDING

(75) Inventors: Keith A. Struckman, Grand Junction, CO (US); Robert T. Martel, Auburn, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 154 days.

(21) Appl. No.: 11/442,491

(22) Filed: May 27, 2006

(65) Prior Publication Data

US 2007/0273576 A1    Nov. 29, 2007

(51) Int. Cl.
G01S 13/72    (2006.01)
G01S 7/40    (2006.01)

(52) U.S. Cl. .................. 342/156; 342/148; 342/188; 342/195

(58) Field of Classification Search .............. 342/95, 342/123, 146, 148, 156, 174, 188–189, 194–195
See application file for complete search history.

(56) References Cited

U.S. PATENT DOCUMENTS

| | | | | |
|---|---|---|---|---|
| 4,449,127 A | * | 5/1984 | Sanchez | 342/80 |
| 5,331,326 A | * | 7/1994 | Schenkel | 342/148 |
| 5,457,466 A | | 10/1995 | Rose | |
| 5,568,394 A | | 10/1996 | Krikorian et al. | |
| 5,694,131 A | * | 12/1997 | Baggett et al. | 342/148 |
| 6,005,510 A | * | 12/1999 | Maurice et al. | 342/45 |
| 6,525,685 B1 | * | 2/2003 | Rose | 342/148 |
| 2007/0247353 A1 | * | 10/2007 | Budic | 342/159 |

OTHER PUBLICATIONS

K.A. Struckman, Resolution of Low Elevation Radar Targets Using A Shifted Array Correlation Technique, IEEE Antenna Propagation Society International Symposium, pp. 1736-1739.
K.A. Struckman & N. Saucier, Direction Finding Using Correlation Techniques, IEEE Antenna Propagation Society International Symposium, pp. 260-263, Jun. 1975.

* cited by examiner

Primary Examiner—Isam Alsomiri
(74) Attorney, Agent, or Firm—Joseph E. Funk

(57) ABSTRACT

Apparatus and a method utilizing correlation interferometer direction finding for determining the azimuth and elevation to an aircraft at long range and flying at low altitudes above water with a transmitting radar while resolving multipath signals. The signals from the radar are received both directly and reflected from the surface of the water using horizontally polarized and vertically polarized antenna arrays, are digitized and are stored in separate covariant matrices. Eigenvalues for the eigenvectors of the matrices processed on signal samples recorded on horizontally polarized X arrays are compared to the eigenvalues for the eigenvectors of the covariance matrices processed on signal samples recorded on vertically polarized X arrays. Incident field polarization is associated with the antenna array measurements that yield the strongest eigenvalue. The eigenvector and eigenvalues for the strongest signal are selected and used for subsequent signal processing. An initial global search assuming mirror sea-state reflection conditions using the signal eigenvector having the strongest eigenvalue is performed to yield an approximate elevation $\alpha$ and azimuth $\beta$ to the aircraft. The approximate values are then used as the starting point for a subsequent conjugate gradient search to determine accurate elevation $\alpha$ and azimuth $\beta$ to the aircraft.

4 Claims, 6 Drawing Sheets $$|R(\alpha,\beta)|^2 = \frac{\sum_{na=1}^{N} \left|\{\rho_d \times A_{pol}(\alpha,\beta,na) + \rho_r \times A_{pol}(-\alpha+\Delta\alpha,\beta+\Delta\beta,na)\}^* \times U_{pol}(na)\right|^2}{\sum_{na=1}^{N} \left|\{\rho_d \times A_{pol}(\alpha,\beta,na) + \rho_r \times A_{pol}(-\alpha+\Delta\alpha,\beta+\Delta\beta,na)\}\right|^2 \times \sum_{na=1}^{N} \left|U_{pol}(na)\right|^2}$$

FIGURE 5

$$|\rho_d|^2 \times \left|\sum_{na=1}^{N} \{A(\alpha,\beta,na)^* \times U(na)\}\right|^2 +$$

$$\rho_d^* \times \rho_r \times \sum_{na=1}^{N} \{A(\alpha,\beta,na)^* \times U(na)\} \times \sum_{na=1}^{N} \{A(-\alpha+\Delta\alpha,\beta+\Delta\beta,na)^* \times U(na)\}^* +$$

$$\rho_d \times \rho_r^* \times \sum_{na=1}^{N} \{A(\alpha,\beta,na)^* \times U(na)\}^* \times \sum_{na=1}^{N} \{A(-\alpha+\Delta\alpha,\beta+\Delta\beta,na)^* \times U(na)\} +$$

$$|\rho_r|^2 \times \left|\sum_{na=1}^{N} \{A(-\alpha+\Delta\alpha,\beta+\Delta\beta,na)^* \times U(na)\}\right|^2$$

FIGURE 6

$$\sum_{na=1}^{N} |U(na)|^2 \times \{|\rho_d|^2 \times \sum_{na=1}^{N} |A(\alpha,\beta,na)|^2 +$$

$$\rho_d^* \times \rho_r \times \sum_{na=1}^{N} \left(A(\alpha,\beta,na)^* \times A(-\alpha+\Delta\alpha,\beta+\Delta\beta,na)\right) +$$

$$\rho_d \times \rho_r^* \times \sum_{na=1}^{N} \left(A(\alpha,\beta,na) \times A(-\alpha+\Delta\alpha,\beta+\Delta\beta,na)^*\right) +$$

$$|\rho_r|^2 \times \sum_{na=1}^{N} |A(-\alpha+\Delta\alpha,\beta+\Delta\beta,na)|^2 \}$$

FIGURE 7

1- $|R|^2$ Conjugate Gradient Convergence, Azimuth $\beta$= 8° Elevation $\alpha$ = 8°
$\Delta\alpha$ = 0.3°, $\Delta\beta$ = -0.75°, Signal-to-Noise Ratio = 20 dB

MULTIPATH RESOLVING CORRELATION INTERFEROMETER DIRECTION FINDING

FIELD OF THE INVENTION

The present invention relates to a correlation interferometer that resolves radar signals received directly from a transmitter on an aircraft flying at low altitudes above the water and severe multi-path radar signals from the same transmitter reflecting from the surface of the water to obtain the azimuth and elevation of the signal while resolving multipath effects.

BACKGROUND OF THE INVENTION

A typical DF interferometer system locates the direction to a remote transmitter by utilizing the phase difference of the transmitter signal arriving at the individual antennas. DF accuracy of such systems is directly related to DF array aperture size which is determined by the spacing between multiple antennas of an antenna array of the DF system. All other things being equal, larger DF apertures increase direction of arrival (DOA) accuracy. However, simply increasing DF aperture sizes without increasing the number of DF antennas leads to large amplitude correlation side lobes and a real potential for large errors.

A basic problem has been to use such a prior art DF interferometer system to locate the elevation and azimuth of a transmitter, such as a radar transmitter, mounted on an aircraft that is flying at low altitudes above water. Signals transmitted from the aircraft mounted radar received by line of sight and reflected from the surface of the water introduce multi-path error into both azimuth and elevation measurements and degrade the reliability of the estimate of the azimuth and elevation of the directly incident radar signal. In the presence of multi-path effects, the wave fronts of the received signal are distorted so that the gradients of a wave front at a given location may be erratic and inconsistent with respect to the location of the signal source.

In addition, either a phase comparison interferometer or an amplitude comparison direction-finding system over a reflecting surface such as seawater will result in multi-path caused errors in the measurement of signal direction-of-arrival. The occurrence of DOA errors due to multi-path propagation is a function of the transmitter elevation angle, frequency, and the roughness of the surface of the seawater.

U.S. Pat. No. 5,568,394, issued Oct. 22, 1996 and entitled "Interferometry With Multipath Nulling" teaches a method that processes interferometer data to provide for rejection of multi-path signal returns from an emitter and computes an improved estimate of the relative angle between the emitter and an interferometer.

To do this interferometric data is gathered that comprises complex signal amplitudes derived from the emitter at a plurality of emitter angles relative to the interferometer antenna array. The complex signal amplitudes derived at each of the plurality of emitter angles are processed by maximizing a predetermined log likelihood function corresponding to a natural logarithm of a predetermined probability density function at each of the plurality of emitter angles to produce a plurality of maximized log likelihood functions. The improved estimate of relative angle between the emitter and the interferometer is made by selecting the emitter angle corresponding to an optimally maximized log likelihood function. The present method rejects multi path signal returns from an emitter and computes an improved estimate of the angle between the emitter and the interferometer array. The processing method uses a maximum likelihood function that incorporates multi-path statistics so that it is robust against multi-path variability. The present processing method may also be employed to reject radome reflections in radars, particularly those employing antennas having a relatively low radar cross-section.

There are a number of shortcomings to the system taught in U.S. Pat. No. 5,568,394 as compared to the present invention. The patent relates to nulling of multi-path reflections that are stable and repeatable, such as own ship multi-path reflections, including signal blockage. This technique uses previously recorded interferometer data that includes these multi-path effects. It does not and cannot resolve multi-path signals, such as reflected from the surface of the ocean, but identifies the most probable incident wave arrival angle based on previous interferometer array calibrations. There is no mention of polarization diverse antenna arrays and the effect of incident field polarization on the multi-path nulling process.

U.S. Pat. No. 5,457,466, issued Oct. 10, 1995 and entitled "Emitter azimuth and elevation direction finding using only linear interferometer arrays" teaches a direction finding system for using a single linear interferometer array mounted on a moving aircraft to make angle of arrival (AOA) measurements only in sensor coordinates to perform emitter direction finding. True azimuth and elevation to an emitter is determined.

Determining accurate angle-of-arrival (AOA) information for low elevation targets using correlation interferometer direction finding is described in a paper by K. A. Struckman, *Resolution Of Low Elevation Radar Targets And Images Using A Shifted Array Correlation Technique*, IEEE Antenna Propagation Society International Symposium (1989), pp. 1736-1739, Jun. 1989, Vol. 3.

These linear interferometer arrays generates a direction of arrival (DOA) vector to provide azimuth with no coning error and elevation for location of an emitter. The elevation is derived from phase measurements of signals received from the emitter in a way that allows sequential averaging to reduce azimuth and elevation range estimate errors.

The system generates virtual spatial arrays from the linear array based on the aircraft's six degrees of freedom or motion. Six degrees of freedom refers to the six parameters required to specify the position and orientation of a rigid body. The baselines at different times are assumed to generate AOA cones all having a common origin; the intersection of these cones gives the emitter DOA, from which azimuth elevation range can be derived. The generation and intersection of the AOA cones can be done in seconds, as opposed to the conventional multi-cone AOA approach, bearings only passive ranging, discussed above. Bearings only passive ranging requires that the origin of the cones be separated by some intrinsic flight path length in order to form a triangle, and subtend bearing spread at the emitter.

There are a number of shortcomings to the azimuth—elevation DF system taught in U.S. Pat. No. 5,457,466 as compared to the present invention. The system is designed to operate on a moving aircraft. There is no mention of polarization diverse antenna arrays and the effect of incident field polarization on the direction finding process. There is no mention of multi-path effects on the operation and accuracy of the system. Such multi-path effects are addressed and solved by the applicant's invention. In addition, ambiguous baselines must be resolved.

Thus, there is a need in the prior art for improved DF systems that can compensate for multi-path effects by rejecting the multi-path signals and provide accurate azimuth and elevation measurements for an aircraft with a transmitting radar flying at low altitudes above water.

SUMMARY OF THE INVENTION

The need in the prior art for an improved DF system that can compensate for multi-path effects by rejecting the multi-path signals and provide for accurate azimuth and elevation measurements to an aircraft at long range and flying at low altitudes above water with a transmitting radar is satisfied by the present invention. The improved system utilizes correlation interferometer direction finding using an expanded, improved version of the technique of correlation that is described in a paper by N. Saucier and K. Struckman, *Direction Finding Using Correlation Techniques*, IEEE Antenna Propagation Society International Symposium, pp. 260-263, Jun. 1975.

High multi-path content received signals are processed using a correlation based signal processing algorithm that provides Multipath Resolving Correlation Interferometer Direction Finding (MR-CIDF). The novel MR-CIDF processing implements a multi-path resolving correlation interferometer that provides high precision direction-of-arrival (DOA) bearings in a severe multi-path environment. Stated another way the MR-CIDF provides a high precision estimate of the true arrival angle of a signal of interest by correlation based processing that resolves both the direct and reflected multi-path signals. This innovative approach develops robust and accurate DOA estimates by computing both the directly incident and multi-path components of signals contained within the signal of interest Field-of-View (FOV), which for this application is an azimuth span of ±45 degrees and an elevation span of 0° to 20°.

The field of view (FOV) of the DF array antenna is composed of two regions, the positive alpha (+α) and negative alpha (−α) space. The positive alpha space is the region defined by an elevation=0° to +20° over the DF antenna array's azimuth coverage of ±45 degrees relative to the broadside direction, β=0°. The negative alpha space is the juxtaposed region mirrored about the horizon defined by an elevation extent of 0° to −20°.

The DF array comprise two cross (X) antenna arrays each having eleven logarithmically spaced positions at each of which are located a pair of antenna elements. The spacing of the antenna positions of one X array is different than the spacing of the antenna positions of the other X array to provide coverage over two adjacent frequency bands. The two X arrays thereby operate over a combined bandwidth of 6:1. Each of the eleven antenna positions in both the X arrays has two antennas, one to receive vertically polarized signals and the other to receive horizontally polarized signals. Both antennas at each position in each array are linearly polarized Vivaldi notch (flared slot) antenna elements and they are both connected to a fixed beam former. The beam former develops a cosecant squared beam shape with the peak of the formed beam pointed at the horizon. The slot of one of each pair of the Vivaldi notch antennas is oriented to receive horizontally polarized signals and the slot of the other of the Vivaldi notch antennas is oriented to receive vertically polarized signals.

The analog outputs of the eleven antenna element beam formers in each of the X arrays are connected to an antenna switch so that the eleven antenna elements of one X array or the other X array may be selected and processed. The selected signals pass through the antenna switch and are input to a bank of receivers to be received and digitized as real and imaginary components (i and q) before signal samples are stored in a covariant matrix. In addition, the antenna switch functions to connect the signals from the antenna elements receiving one type of polarized signals in an array to the receivers before connecting the signals from the antenna elements receiving the other type of polarized signals in the same array. Thus, horizontally polarized signals are received and stored separately from the vertically polarized signals in the covariance matrices.

Ideally numerous measurements or samples of a received signal of interest (SOI) are digitized and the data is inserted in real and imaginary format into a measured covariance matrix. Signal eigenvectors are then computed from each covariant matrix. These eigenvectors are inserted into a ratio of quadratic forms correlation function that is used to compute the correlation between the signal eigenvectors and array steering vectors retrieved from previously recorded array calibration manifolds. The ratio of quadratic forms function is maximized over the reflected signal reflection coefficients.

The eigenvalues for the eigenvectors of the matrices generated by the signal samples recorded on the horizontally polarized array are then compared to the eigenvalues for the eigenvectors of the covariance matrices generated by the signal samples recorded on the vertically polarized array to determine which signal polarization has the strongest eigenvalue. That eigenvector and the eigenvalues for that signal are selected and used for subsequent signal processing.

An initial global search assuming mirror sea-state reflection conditions using the signal eigenvector having the strongest eigenvalue with steering vectors retrieved from the calibration array manifold is then performed upon making assumptions including that there are mirror reflection conditions off the surface of the water. This search is not a conjugate gradient search. This initial search is a fairly coarse search over all the data stored in the matrices to quickly find the highest peak of the many peaks in the data and this yields first, approximate values for elevation α and azimuth β to the aircraft flying low over water while emitting electromagnetic signals. The approximate values of azimuth and elevation are then used as the starting point for a fine conjugate gradient search that uses the selected array manifold in the region of the approximate values for elevation α and azimuth β to converge to the exact values of azimuth and elevation to the aircraft in the +α space. Being as the conjugate gradient search starts near the true peak in the stored data, as shown in a correlation surface reflecting the data, all the data stored in the matrices need not be searched and this speeds the searching.

MR-CIDF DOA computations are based on the subsequent conjugate gradient multi-dimensional search for the minimum of the function $F(1-R^2)=1-\text{MR-CIDF}(|R|^2)$ using the data stored in the selected covariant matrices. The term $(1-R^2)$ causes the result of the conjugate gradient search to be a minimum rather than a maximum. The approximate values $(\alpha^a, \beta^a)$ for the starting point in the neighborhood of the $(1-|R|^2)$ minimum is selected during the global search as described in the previous paragraph. Next the gradient of $F(1-R^2)$ as a function of the upper hemisphere α and β and lower hemisphere $-\alpha+\Delta\alpha, \beta+\Delta\beta$) values is computed. Next, a line search in the direction of this minimum in this first gradient is computed. At this line search minimum, a new gradient is computed which is then inserted into a conjugate gradient search routine that computes the next direction for a new line search which is then searched for a minimum. These search steps quickly converge to a global minimum, which is identified by slope gradient computations that are approximately equal to zero. The correlation function MR- CIDF ($|R|^2$) is always less than unity, therefore $F(1-R^2)$ is always greater than zero. The conjugate gradient process minimizes $F(1-R^2)$ as a function of upper DOA and lower reflection of arrival directions. The desired upper hemisphere DOA is identified as the direction to the low flying aircraft.

To correct for array distortions, such as electromagnetic scattering caused by the platform on which the X arrays are mounted, a calibration array manifold correlation table constructed during system calibration is used during processing. The calibration of the X arrays is developed in an accurately calibrated compact range. Array calibration data is collected in one degree alpha and beta increments of the array's FOV. Array calibrations are stored in precise real and imaginary values for both vertical and horizontal polarizations. Fine grained DOA processing depends on the accurate interpolation of the array calibration manifold.

DESCRIPTION OF THE DRAWINGS

The invention will be better understood upon reading the following Detailed Description in conjunction with the drawing in which:

FIG. 5 is an equation used to process signal eigenvectors and eigen values and perform a conjugate gradient search to determine an accurate DOA to a low flying aircraft or missile;

FIG. 6 shows an expanded numerator of the equation shown in FIG. 5;

FIG. 7 shows an expanded denominator of the equation shown in FIG. 5;

DETAILED DESCRIPTION

Figure 1:
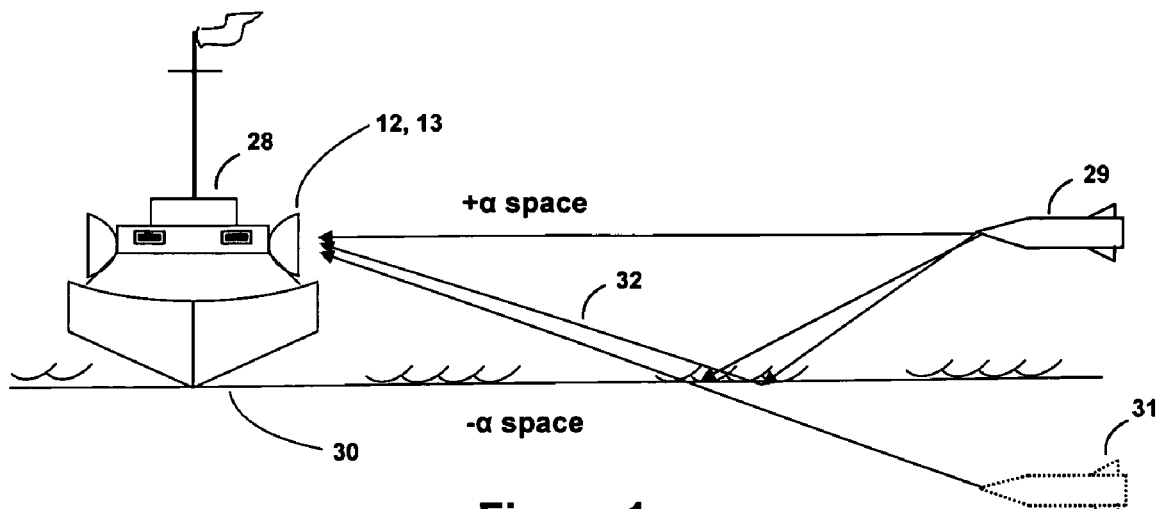
FIG. 1 is a drawing showing radar signals received on a ship both directly from an aircraft or missile and as multipath reflections from the surface of water over which the aircraft or missile is flying at low altitude.

In the following detailed description and the drawings there are numerous terms used that are defined below:

$A_{pol}(\alpha,\beta)$ are the calibration vectors as a function of $\alpha$ (the elevation angle) and $\beta$ (the azimuth angle) where:

$A_{pol}=A_v$(vertical) or $A_h$ (horizontal) calibration array manifold data base.

$+\alpha$=the space above the surface of the water.

$-\alpha$=the space below the surface of the water.

CIDF=Correlation Interferometer Direction Finding.

MR-CIDF=Multipath Resolving Correlation Interferometer Direction Finding

DF=direction finding.

DOA=direction of arrival, and consists of both the azimuth angle $\beta$ and elevation angle $\alpha$ of a received signal.

E=electromagnetic radio waves incident on the array of antennas.

Na=number of antennas in each beam forming/direction finding array, eleven herein.

(i, q)=in-phase and quadrature-phase of a complex quantity.

Rxx=measured covariance matrix.

$\lambda$=eigenvalues of the measured covariance matrix.

Q=signal eigenvector of the measured covariance matrix.

$\rho_d$=the direct complex coefficient $\rho_r$=the reflected complex coefficient SNR=signal-to-noise ratio.

$U_{pol}$=is the eigenvector resolved received signal vector and is composed of the direct component ($+\alpha$ space) and the reflected component ($-\alpha$ space) where:

$U_{pol}=U_v$ (vertical receive array) or $U_h$ (horizontal receive array).

$\alpha$=elevation angle $\beta$=azimuth angle

*=a complex conjugate

MR-CIDF correlation squared, $|R(\alpha,\beta)|^2$, is defined by the equation in FIG. 5 where the terms in the equation are defined above. MR-CIDF is maximized over the DOA parameters $\alpha$, $\beta$ and the complex coefficients $\rho_d$, $\rho_r$. Maximization of MR-CIDF over $\alpha$, $\beta$ is achieved by scanning over the array manifold data base. Maximization of MR-CIDF over $\rho_d$, $\rho_r$ is achieved by a observing that MR-CIDF is the ratio of quadratic forms that can be maximized in closed form. This maximization is described as follows.

We expand the numerator of the equation in FIG. 5 which defines the squared correlation term $|R(\alpha,\beta)|^2$ to get the expanded numerator term shown in FIG. 6.

We expand the denominator of the equation in FIG. 5 which defines the squared correlation term $|R(\alpha,\beta)|^2$ to get the expanded denominator term shown in FIG. 7.

To simplify the description of the closed form maximization process, let H and G terms be defined as follows in Equation EQ 1:

$$H_{11} = \left| \sum_{na=1}^{N} \{A(\alpha, \beta, na)^* \times U(na)\} \right|^2 \quad \text{(EQ 1:)}$$

$$H_{12} = \sum_{na=1}^{N} \{A(\alpha, \beta, na)^* \times U(na)\} \times \sum_{na=1}^{N} \{A(-\alpha + \Delta\alpha, \beta + \Delta\beta, na) \times U(na)^*\}$$

$$H_{21} = \sum_{na=1}^{N} \{A(\alpha, \beta, na)^* \times U(na)\}^* \times \sum_{na=1}^{N} \{A(-\alpha + \Delta\alpha, \beta + \Delta\beta, na)^* \times U(na)\}$$

-continued $$H_{22} = \left| \sum_{na=1}^{N} \{A(-\alpha + \Delta\alpha, \beta + \Delta\beta, na)^* \times U(na)\} \right|^2$$

$$G_{11} = \sum_{na=1}^{N} |U(na)|^2 \times \sum_{na=1}^{N} |A(\alpha, \beta, na)|^2$$

$$G_{12} = \sum_{na=1}^{N} |U(na)|^2 \times \sum_{na=1}^{N} (A(\alpha, \beta, na)^* \times A(-\alpha + \Delta\alpha, \beta + \Delta\beta, na))$$

$$G_{21} = G_{12}^*$$

$$G_{22} = \sum_{na=1}^{N} |U(na)|^2 \times \sum_{na=1}^{N} |A(-\alpha + \Delta\alpha, \beta + \Delta\beta, na)|^2$$

Substituting the G and H terms in Equation 1 into the equation in FIG. 5 we get the following equation EQ 2:

$$|R(\alpha, \beta)|^2 = \frac{|\rho_d|^2 \times H_{11} + \rho_d^* \times \rho_r \times H_{12} + \rho_d \times \rho_r^* \times H_{21} + |\rho_r|^2 \times H_{22}}{|\rho_d|^2 \times G_{11} + \rho_d^* \times \rho_r \times G_{12} + \rho_d \times \rho_r^* \times G_{21} + |\rho_r|^2 \times G_{22}} \quad \text{(EQ 2:)}$$

The characteristic equation of Hermitian forms is: $[H-\gamma G]=0$. The roots to this equation are called the characteristic values of the pencil. The largest root of this equation is the maximum of the ratio of Hermitian forms shown in EQ 3 as follows.

$$\gamma_{max} = \text{maximum of}\left(\frac{H(x, y)}{G(x, y)}\right). \quad \text{(EQ 3:)}$$

$|R(\alpha,\beta)|^2$ has this form, thus the maximum value of $|R(\alpha,\beta)|^2$ at angles $\alpha, \beta, -\alpha+\Delta\alpha$ and, $\beta+\Delta\beta$ is the solution to the determinant shown in EQ 4:

$$\begin{bmatrix} H_{11} - \gamma_{max} \times G_{11} & H_{12} - \gamma_{max} \times G_{12} \\ H_{21} - \gamma_{max} \times G_{21} & H_{22} - \gamma_{max} \times G_{22} \end{bmatrix} \quad \text{(EQ 4:)}$$

This determinant equation is solved by the quadratic equation shown in EQ 5: (EQ 5:)

$$a \times \gamma_{max}^2 + b \times \gamma_{max} + c = 0$$

$$a = G_{11} \times G_{22} + |G_{12}|^2$$

$$b = -(H_{11} \times G_{22} + H_{22} \times G_{11}) + (H_{12} \times G_{21} + H_{21} \times G_{12})$$

$$c = H_{11} \times H_{22} - H_{12} \times H_{21} = 0$$

The maximum value of $|R(\alpha,\beta)|^2$ is therefore shown in EQ 6 following:

$$\max(|R(\alpha, \beta)|^2) = \gamma_{max} = -\frac{b}{a} \quad \text{(EQ 6:)}$$

The final search for the maximum of $|R(\alpha,\beta)|^2$ is achieved by conjugate gradient searching for the minimum of $1-|R(\alpha,\beta)|^2$ The $+\alpha$ space is that elevation or space above the surface of the water and the $-\alpha$ space is that elevation or space below the surface of the water where the reflected image of the received signal comes from.

In the following detailed description the term direction of arrival (DOA) is the term that is used and includes both the azimuth angle $\beta$ and elevation angle $\alpha$ of a received signal.

In the following description eigenspace is defined as follows. If $R_{xx}$ is an Na×Na square matrix and $\lambda$ is an eigenvalue of $R_{xx}$, then the union of the zero vector 0 and the set of all eigenvectors corresponding to eigenvalues $\lambda$ is known as the eigenspace of $\lambda$. The terms eigenvalue and eigenvector are well known in the art.

In the following description reference is made to eigenspace decompositions. Eigenspace decompositions are well known in the art and are used in solving many signal processing problems, such as source location estimation, high-resolution frequency estimation, and beam forming. In each case, either the eigenvalue decomposition of a covariance matrix or the singular value decomposition of a data matrix is performed. For adaptive applications in a non-stationary environment, the eigenvalue decomposition is updated with the acquisition of new data and the deletion of old data. For computational efficiency or for real-time applications, an algorithm is used to update the eigenvalue decomposition code without solving the eigenvalue decomposition problem from the start, i.e., an algorithm that makes use of the eigenvalue decomposition of the original covariance matrix. In numerical linear algebra, this problem is called the modified eigenvalue problem. In the example of the invention disclosed herein, with only one signal being received, the array vector for that signal is equal to its eigenvector. This is more fully described hereinafter.

In FIG. 1 is a drawing showing radar signals received on a ship 28 both directly from an aircraft or missile 29 and as a multi-path reflection from the surface of water 30 over which the aircraft 29 is flying at low altitudes. The multi-path reflection makes it appear to DF equipment on ship 28 that there is an image aircraft or missile 31 that is not real.

Figure 2:
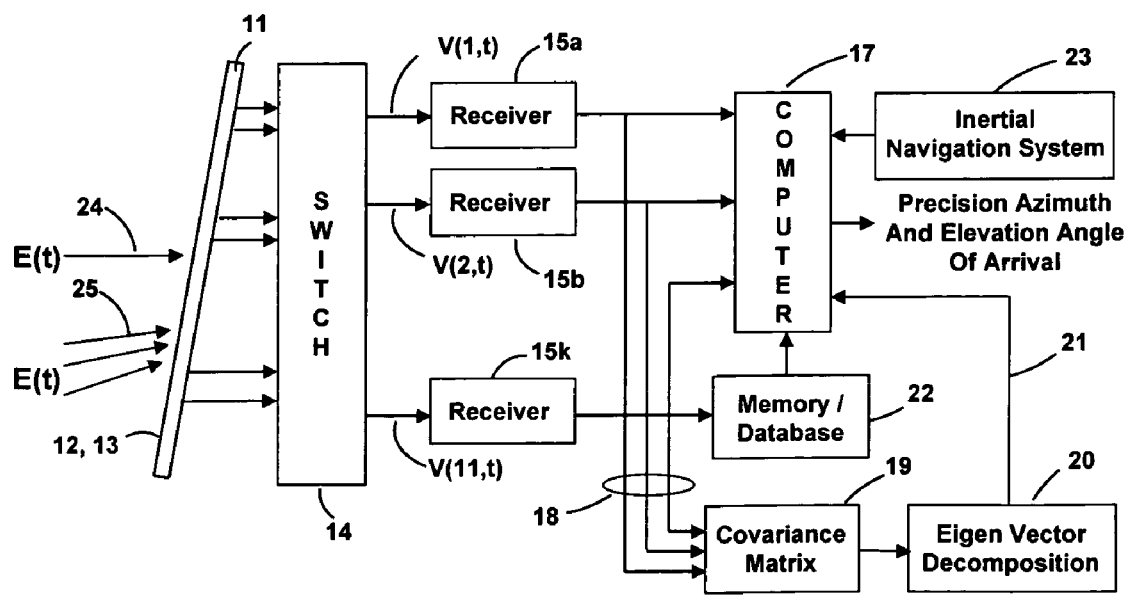
FIG. 2 is a schematic block diagram of a DF system that utilizes the teaching of the present invention to provide azimuth and elevation information for a radar transmitting from an aircraft or missile that is flying at low altitudes above water.

In FIG. 2 is a detailed block diagram of a DF system that utilizes the teaching of the present invention to provide elevation and azimuth information for transmitters located on aircraft or missile 29 flying low over water 30 as shown in FIG. 1. The novel Multipath Resolving Correlation Interferometer Direction Finding (MR-CIDF) processing utilizes a conjugate gradient based search routine to implement a multi-path resolving correlation interferometer that provides high precision direction-of-arrival (DOA) bearings in a severe multi-path environment. Stated another way the MR-CIDF provides a high precision estimate of the true arrival angle of a signal of interest by correlation based processing that resolves both the direct and multi-path reflected signals.

Figure 3:
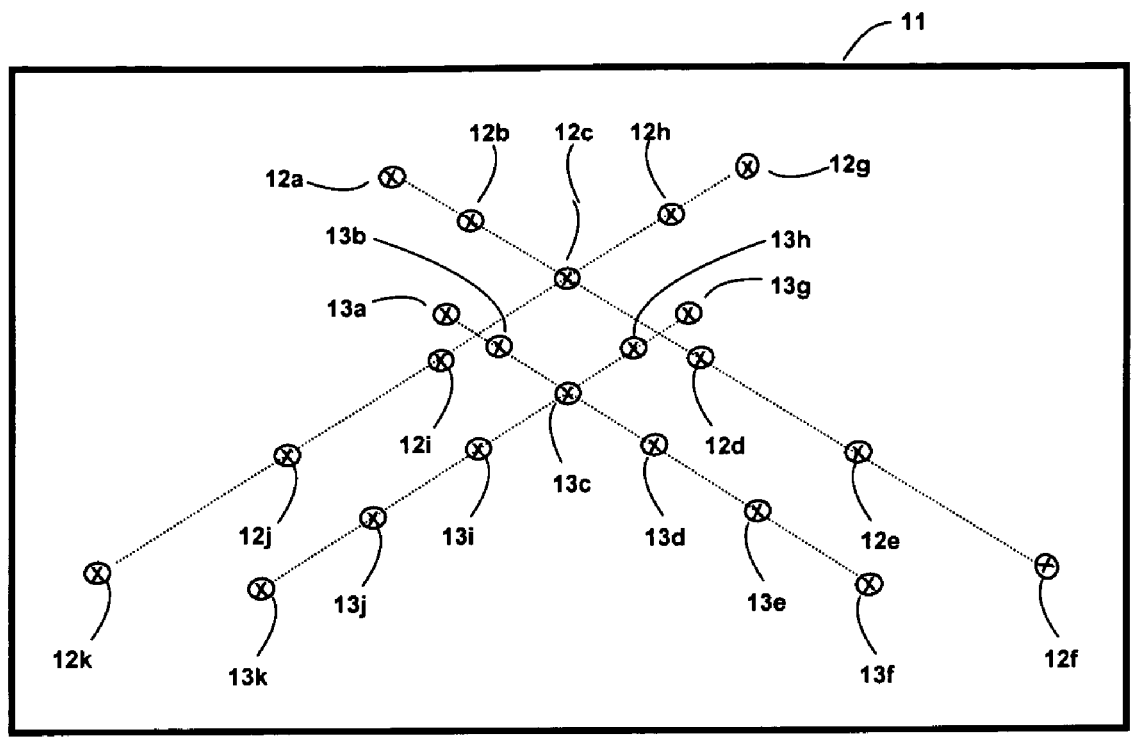
FIG. 3 shows a dual X array, logarithmic DF antenna utilized with the invention.

DF antenna array 11 comprises two logarithmically spaced cross (X) beam formed antenna arrays 12 and 13 of antenna elements lying in a plane that is tilted back twenty degrees from the vertical. These antenna arrays are not shown in FIG. 1 but are shown in and described with reference to FIG. 3. In FIG. 3 is shown the dual X array 11, DF antenna utilized with the invention. There are four primary objectives for using the X array design: (1) a robust design concept to reduce the probably of "wild" DF bearings under multi-path conditions; (2) an accurate DF array that operates over a six to one ratio, maximum operating frequency to minimum operating frequency; and (3) an azimuth aperture to RF wavelength ratio that is greater or equal to 10 and (4) switch selectable orthogonally polarized (vertical and horizontal) antennas.

In FIG. 2, two incident electromagnetic signals E(t) 24 and E(t) 25 impinge on the individual X array antennas 12 and 13 of array 11. Signal E(t) 24 is a radar signal received directly by line of sight from a radar transmitter mounted on an aircraft or missile flying at a low altitude above water. Signal E(t) 25 is the radar signal from the same radar transmitter but it is reflected from the surface of the water as shown in FIG. 1. Thus, signals E(t) 24 and E(t) 25 are the same signal received at approximately the same azimuth but the angles of elevation are different because the signal E(t) 25 is reflected from the surface of the water. In addition, the angles of elevation and the phase differences of the received signal E(t) 25 will vary as represented by the three arrows in FIG. 1 because the water is not a smooth surface. There are typically swells and waves on the surface of the water.

The reflection coefficient of seawater depends on the polarization of the transmitted E-field. For a vertically polarized wave at 10 GHz, the magnitude of the reflection coefficient is 0.8 at a grazing angle of one degree and the magnitude is 0.15 at a grazing angle of ten degrees. For a horizontally polarized wave at 10 GHz, the magnitude of the reflection coefficient is 0.995 at a grazing angle of one degree and the coefficient is 0.95 at a grazing angle of ten degrees. The difference in received power for the two polarizations at a 10° grazing angle is 16 dB. A result of the smaller vertical reflection coefficient is that the severity and frequency of occurrence of multi-path caused direction finding errors may be substantially reduced for vertical polarization. This observation has been verified with tests at 9.3 GHz and 10° elevation.

When the reflecting surface is smooth or slightly rough, reflections from the surface are specular and follow the laws of classical optics; they are coherent in phase and direction. Reflections from a rough surface are termed diffuse and are reflected in random directions. Diffuse scattered energy reaching the receiver antenna has random phase. When diffuse reflections occur from water wave facets, the grazing angle for reflection from a single facet will also be random and a function of the facet slope. As a result, the amplitude of diffuse scattering is also random, and the peak variation is greatest for vertical polarization. MR-CIDF processing assumes that the ensemble of diffuse paths merge into a single composite reflected signal.

Whether a surface may be considered smooth or rough depends on the magnitude of the diffuse energy received relative to the specular energy received. For direction finding systems, a ratio of 10 dB may be used as the criteria for selecting the transition point in surface roughness.

The signals E(t) 24 and E(t) 25 impinge on the individual antenna elements of X beam formed antenna arrays 12 and 13 at different times as determined by their angle of incidence upon the plane of array 11 and the spacing of the individual antenna elements.

X antenna arrays 12 and 13 are used to receive and process signals from different portions of the electromagnetic spectrum so their physical dimensions are different. The signals received by only one of these two X antenna arrays is processed at any one time. Accordingly, antenna switch 14 is utilized. Antenna switches are well known in the art. Both of the X array antennas 12 and 13 each have twenty-two beam formed arrays consisting of Vivaldi notch (flared slot) antennas, as briefly described above and as shown in and described in detail hereinafter with reference to FIG. 3. Switch 14 is used to minimize the number of receivers 15 that receive and process the signals from the twenty two beam formed arrays. Switch 14 is controlled by computer 17 to switch the receivers 15 to either eleven beam formed, vertically polarized, X array antennas, or to eleven beam formed, x array antennas.

FIG. 3 shows the DF antenna array 11 that is comprised of two logarithmically spaced cross (X) beam formed antenna arrays 12 and 13 of antenna elements 12a-12k and 13a-13k. The spacing of the antenna elements of one X array is different than the spacing of the antenna elements of the other X array to provide coverage over two adjacent frequency bands. The two X arrays thereby operate over a combined bandwidth of 6:1. X array 12 comprises eleven antenna positions in each of which are located two linearly polarized beam formed arrays consisting of Vivaldi notch (flared slot) antenna elements. This is a total of twenty-two antenna beam formers. X array 13 comprises eleven antenna positions in each of which are located two linearly polarized beam formed arrays. There is also a total of twenty-two beam formed antenna arrays for X array 13. The slots of one of each set of the Vivaldi notch antennas, for each beam former, is oriented to receive horizontally polarized signals and the slots of the other set of the Vivaldi notch antennas is oriented to receive vertically polarized signals.

More particularly, X array 12 comprises eleven antenna positions 12a-12k. At each of these eleven positions there are two sets of beam formed Vivaldi notch (flared slot) antennas. One beam former at each position is oriented to receive horizontally polarized signals, and the other beam former at each position is oriented to receive vertically signals. Similarly, X array 13 comprises eleven antenna positions 13-13 and there are two beam formers at each of these positions that function in the same manner.

X array 12 has two arms. The first arm has positions 12a, 12b, 12c, 12d, 12e and 12f, and the second arm has positions 12g, 12h, 12c, 12i, 12j and 12k. This is a total of eleven positions associated with X array 12. X array 13 also has two arms. The first arm has positions 13a, 13b, 13c, 13d, 13e and 13f, and the second arm has positions 13g, 13h, 13c, 13i, 13j and 13k. This is a total of eleven positions associated with X array 13. As described above there are two beam formed arrays at each position. It should be noted that the two beam formers at center position 12c are used in both arms of X array 12, and the two beam formers at center position 13c are used in both arms of X array 13.

Returning to switch 14, it is operated in two combinations to obtain one set of signal samples. The following order of switching is for example only. First, the horizontally polarized antennas in array positions 12a through 12k are connected through switch 14 to receivers 15a-15k. Second, the vertically polarized antennas in array positions 12a through 12k are connected through switch 14 to receivers 15a-15k. Alternatively, but much more costly, a total of twenty two receivers could be used and no vertical to horizontal switching would need to be introduced.

The signals from the eleven antenna elements of the portion of the selected one of the X antenna arrays 12 or 13 that pass through switch 14 are represented by voltage terms V(1,t) through V(11,t). The voltage terms V(1,t) through V(11,t) denote the complex analog waveform envelope that is output from each of the 11 beam formed Vivaldi slot antenna arrays connected through switch 14 and is the only quantity that conveys information. Mathematically each signal represents a radar signal of interest and a noise component $\eta(n,t)$ and is represented by EQ 7.

$$V(n, t) = E_d(n, t)A_{pol}(\alpha, \beta) + \qquad (EQ\ 7:)$$
$$\sum_{l}^{K} E_{k,r}(n, t)A_{pol}(-\alpha + \Delta\alpha_k, \beta + \Delta\beta_k) + \eta(n, t)$$

Where: $E_d(n,t)$=direct incident field at beam formed array n.

$E_{k,r}(n,t)=k_{th}$ sea state reflected incident files at beam formed array n.

$A_{pol}$=beam formed array response for the $k_{th}$ glint angle.

K=number of diffuse relections $\eta(n,t)$=noise associated with the $n_{th}$ receiver channel.

The voltages V(1,t) through V(11) are input to a respective one of the eleven receivers 15a-15k as shown. The signals output from each of receivers 15a-15k are in digitized format and are forwarded to computer 17. Computer 17 Nyquist samples the signals from the selected eleven beam formers and stores the digitized samples in covariance matrices in a manner well known in the art.

More particularly, signals output from receivers 15a-15k in digital format are sampled, converted to real and imaginary values and stored in a plurality of covariance matrices in circuit 19. The typical sequence is to Nyquist sample the received signals and record a set of samples for each of the eleven beam formers and connected through switch 14 at any moment in time. A number of sets of these signal samples are measured and processed into individual measured covariance matrices.

In block 20 in FIG. 2 each set of covariance matrices undergo eigenspace decomposition to produce signal eigenvectors (U array vectors) and eigenvalues having azimuth and elevation information for the direct and reflected radar wave arrival information. The eigenvectors and eigenvalues are forwarded to computer 17 via path 21. The functions performed in blocks 19 and 20 are performed by a processor in a manner known in the art. The processes performed in blocks 19 and 20 may be performed by computer 17 but the functions performed are shown as separate blocks 19 and 20 to aid in understanding the invention. Covariance matrices and eigenspace decompositions are both known in the art and are used in solving many signal processing problems, such as source location estimation, high-resolution frequency estimation, and digital beam forming. The parallel receiver channel architecture of covariance matrix processing is used to ensure that all correlation surfaces are associated with a single remote transmitter and that the measured data is not corrupted by co-channel RF interference. Multiple co-channel signals are identified by observing measured covariance matrix eigenvalues. Single signal conditions establish one strong signal eigenvalue and Na–1 noise eigenvalues when intercepted and received on Na RF channels, here Na=11.

For adaptive applications in the non-stationary environment of the present invention, the eigenvalue decomposition is updated with the acquisition of new data and the deletion of old data every few milliseconds. This occurs for each of the previously mentioned two sets of signal samples taken from the horizontal or vertical beam formers at positions 12a- 12k or 13a-13k. The highest peak in each new set of updated data is close to the highest peak in the previous set of data so a new, coarse global search is not performed on each new set of updated data. Instead α and β values from the previous conjugate gradient search are used as the starting point for the conjugate gradient search on the new set of updated data. For computational efficiency or for real-time applications, an algorithm is used to update the eigenvalue decomposition code without solving the eigenvalue decomposition problem from the beginning again, i.e., an algorithm that makes use of the eigenvalue decomposition of the original covariance matrix. In numerical linear algebra, this problem is called the modified eigenvalue problem.

A typical processing sequence is as follows, the received signals (V(1,t)-V(11,t)) received on the individual antennas 12a- 12k or 13a-13k of an antenna switch 14 selected one of arrays 12 or 13 are passed through the antenna switch to a plurality of receivers 15a-15k where they are digitized and sampled at a Nyquist sampling rate to generate 1024 samples for each of the eleven outputs of the horizontal and vertical polarization beam formers. The sets of digitized signal samples are processed into two individual covariance matrices one for each of the polarization dependent beam formers. One set of signal samples is for the signals from the vertically polarized antennas and the other set of signal samples is for the signals from the horizontally polarized antennas. These covariance matrices undergo eigenspace decomposition to produce two sets of eleven signal array U vectors and eigenvalues that contain the incident and reflected transmitter azimuth (β) and elevation (α) and other information for each of the sampling periods. The preferred way to develop an array vector is to decompose a covariance matrix as a signal eigenvector having an eigenvalue, and associate an array vector with the signal eigenvector. The U eigenvector associated with the strongest vertical polarization or horizontal polarization signal eigenvalue computation is selected for direction of arrival (DOA) processing.

Selection of vertical or horizontal polarization is determined in the following manner. The signal is vertically polarized if $[U_v, U_v] > [U_h, U_h]$ and is horizontally polarized if $[U_v, ] < [U_h, U_h]$ and $[U_{pol}, U_{pol}]$=the inner product of $U_{pol}$. Having selected the polarization of the received signal as defined above then $A = A_{pol}$ and $U = U_{pol}$.

To correct for array distortions caused by the platform on which the antenna arrays 12 and 13 are mounted, a calibration array manifold correlation table constructed during system calibration is accessed to read out calibration data over the azimuth β, at +α and −α elevation sectors of interest. This calibration data is initially correlated by an initial global search, by the maximized correlation function described shown in FIG. 5 over the wave arrival sector of interest with Δα and Δβ set equal to zero, and assuming mirror reflection conditions. β represents azimuth and α represents elevation. The result is a point marked W in FIG. 4 indicating approximate values of α and β which are close to the real values of α and β. The approximate values of α and β from the initial global search are used in a subsequent conjugate gradient search as the starting point that is close to actual point W to quickly locate the real values of α and β. Being as the conjugate gradient search starts near the true, corrected peak in the stored data, as shown in a correlation surface reflecting the data, all the data stored in the matrices need not be searched and this speeds the searching.

Figure 4:
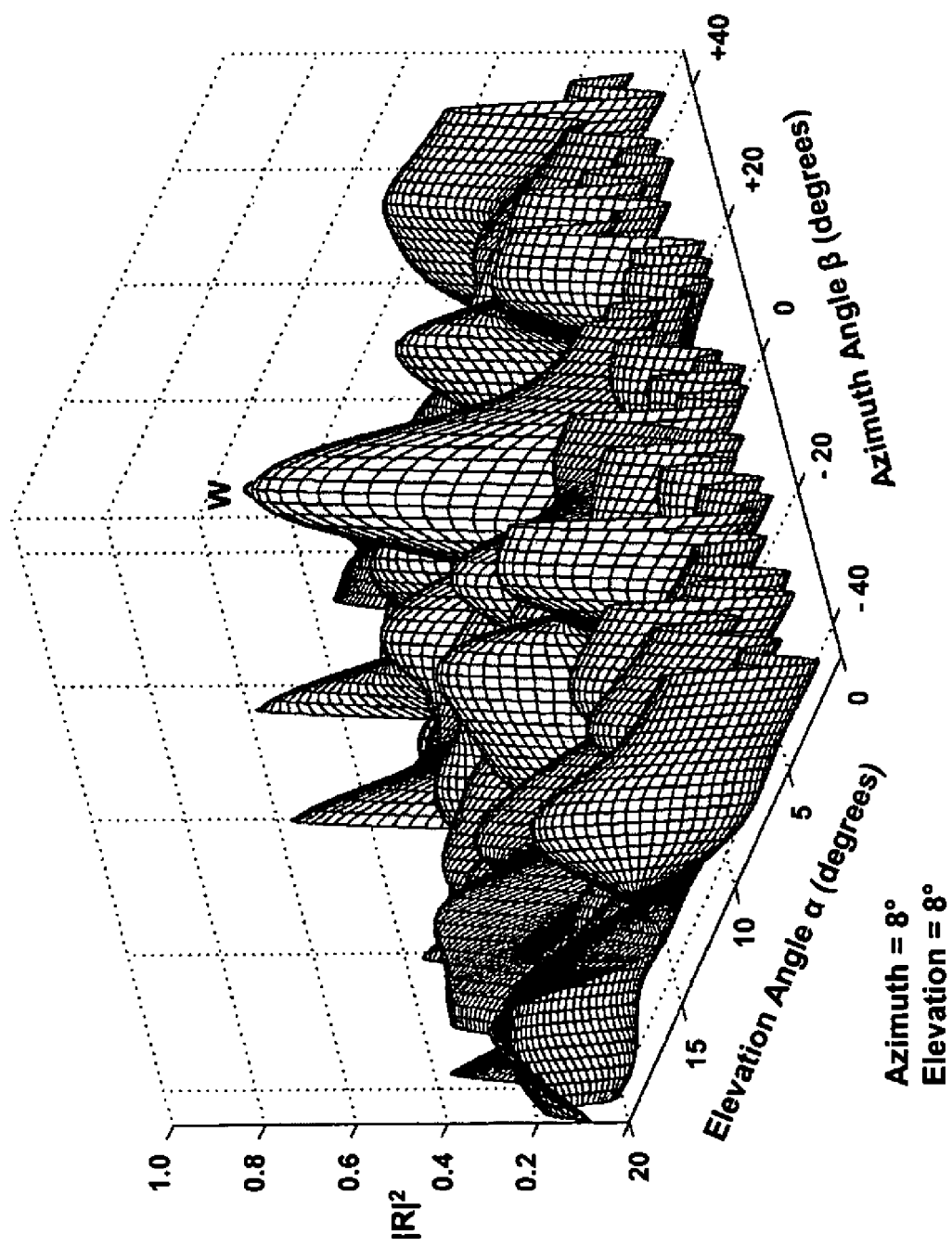
FIG. 4 shows a correlation surface produced by graphing sampled data assuming mirror image reflection off the surface of the water to determine a starting point for a subsequent conjugate gradient based correlation search to determine an accurate DOA to an aircraft or missile flying low over water.

More particularly, FIG. 4 graphically shows, at a middle operating frequency, the result of this global search correlation process as a correlation surface for incident and reflected wave arrival angles at β=8°, α=8°, Δα=0.3° and, Δβ=−0.75° for incident of reflection coefficients, $\rho_d$=1.0 and $\rho_r$=1.0. The global search correlation surface shown in FIG. 4 exhibits narrow peaks and low correlation side lobes indicating accurate DOA solutions and robust array performance. The resultant DOA solution based on this specular mirror reflection based computation is slightly in error since this initial correlation surface based solution assumes that $\Delta\alpha=0°$ and $\Delta\beta=0°$. In FIG. 4 this error is shown as point W at the highest peak, but the position of the highest peak is in error because of the assumption made.

Figure 8:
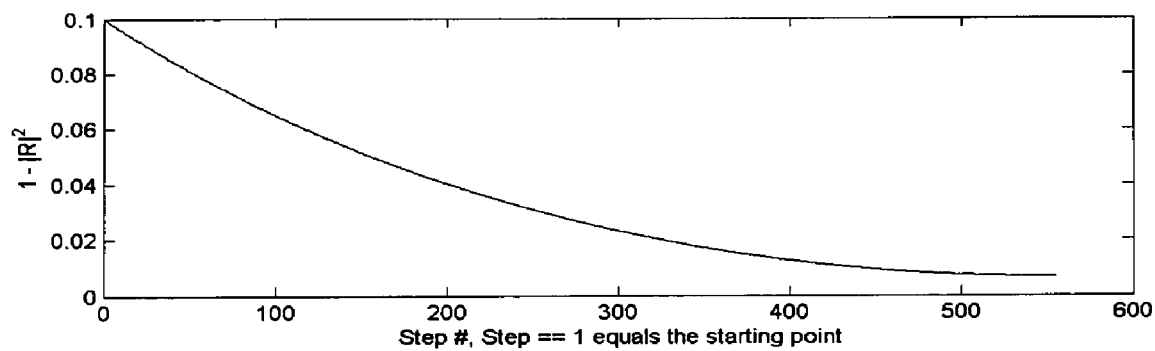
FIG. 8 is a graph showing the results of a conjugate gradient searching and the minimization of $(1-|R|^2)$ achieved thereby.
Figure 9:
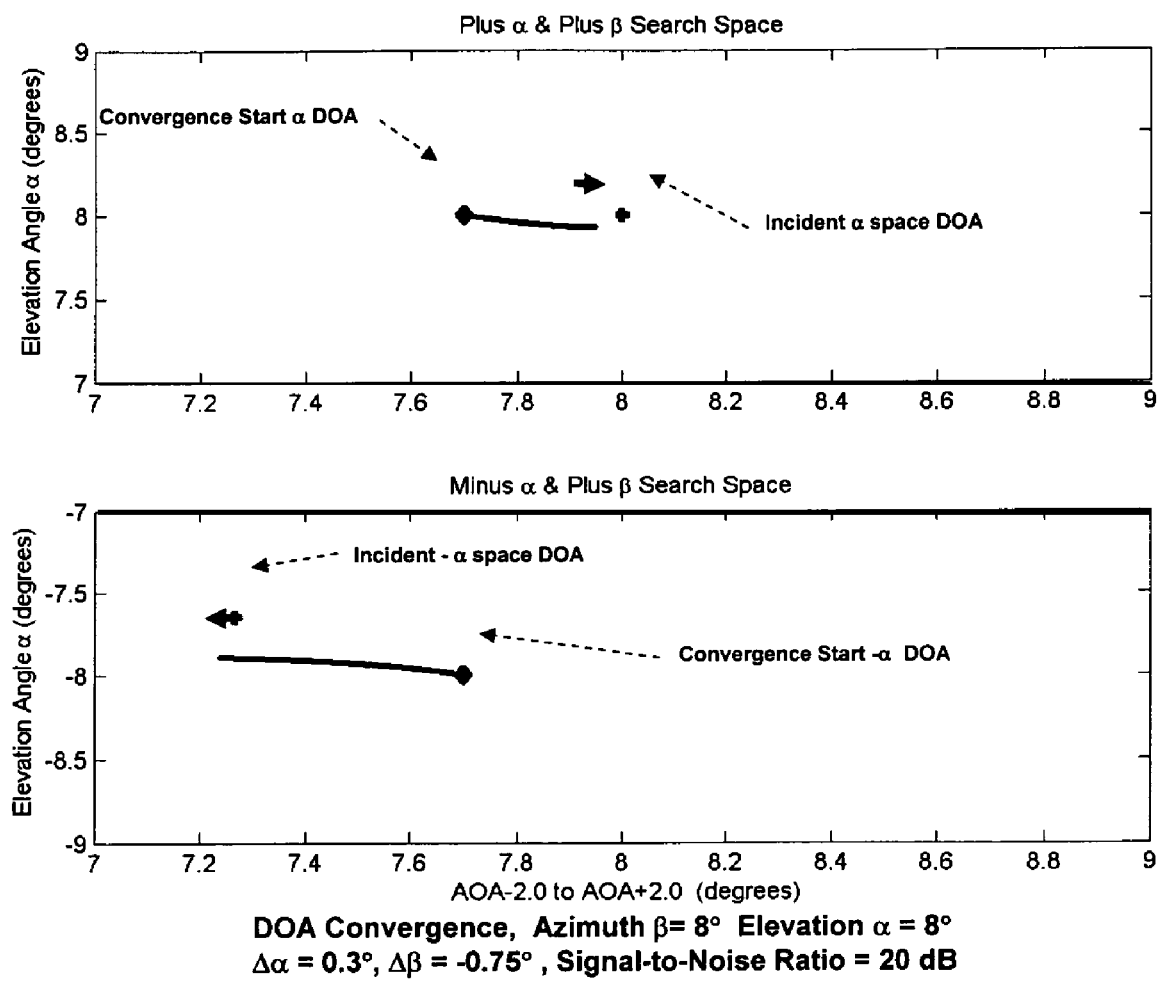
FIG. 9 shows two graphs of how the gradient search process achieves a convergence to the correct DOA value.

The correct DOA parameters should yield $\Delta 60 = 0.3°$ and $\Delta\beta=-0.75°$. These correct DOA parameters are computed by a subsequent conjugate gradient based search routine on the array manifold used to graph the correlation surface shown in FIG. 4 that starts with the approximate $\alpha$, $\beta$ values computed as described above for the initial global search with $\Delta\alpha=0$ and $\Delta\beta=0$ and hill-climbs over these parameters to the maximum of the correlation process described by the equation shown in FIG. 5. This $|R|^2$ maximization is computed by minimizing $1-|R|^2$. The convergence of $1-|R|^2$ to a minimum for the numerical example described above is shown in FIG. 8. Since the numerical experiment was based on a 20 dB SNR, the minimum is not equal to zero but is equal to approximately 0.005. The convergence to the correct DOA values is shown in FIG. 9. The mirror reflection values shown for $+\alpha$ and $+\beta$ search space starts with $\beta \approx 7.7°$, $\alpha \approx 8°$ and converges approximately to the true direct incident vales of $\beta \approx 8°$, $\alpha \approx 8°$. The mirror reflection values shown minus $\alpha$ and plus $\beta$ search space starts with $\beta \approx 7.7°$, $\alpha \approx 8°$ and converges approximately to the correct reflected values of $\beta \approx 8°$, $\alpha \approx 8°$, $\Delta\beta \approx -0.75°$, $\Delta\alpha \approx 0.3°$. The small residual errors are due to noise introduced at the 20 dB SNR level. As the conjugate gradient search routine progresses over several hundred search steps, as shown in FIG. 8, and gets closer to the true values of $\alpha$ and $\beta$ the value of $|R|^2$ approaches a maximum value. When this value is used in $1-|R|^2$ the resulting value approaches zero as shown in FIG. 8. However, it will never reach zero due to noise. This is described in greater detail hereinbelow.

Maximization starting with mirror reflection conditions reduces the conjugate gradient initial starting parameter problem. The reason for this is as follows. The log-periodic array design limits the correlation surface to one single highest peak. If a starting point for a conjugate gradient searching sequence is chosen on the sloped side of this single highest peak, and is near the peak, the conjugate gradient searching will rapidly climb to the peak and in the process resolve $\alpha$, $\beta$, $\Delta\alpha$ and $\Delta\beta$. Optimization of the correlation process also involves the computation of the direct and reflected coefficients, these terms are however computed as output parameters but are hidden within the closed form maximization process of the equation shown in FIG. 5.

Stated another way, the initial global search is a fairly coarse search over all the data stored in the matrices to quickly find the highest peak of the many peaks in the data and this yields first, approximate values for elevation $\alpha$ and azimuth $\beta$ to the aircraft. The approximate values of azimuth and elevation are then used as the starting point for the conjugate gradient search that uses the selected array manifold in the region of the approximate values for elevation $\alpha$ and azimuth $\beta$ to converge to the exact values of azimuth and elevation to the aircraft in the $+\alpha$ space. Being as the conjugate gradient search starts near the true peak in the stored data, as shown in a correlation surface reflecting the data, all the data stored in the matrices need not be searched and this speeds the searching for the true value of elevation $\alpha$ and azimuth $\beta$ to the aircraft.

For adaptive applications in the non-stationary environment of the present invention, the eigenvalue decomposition is updated with the acquisition of new data and the deletion of old data every few milliseconds. This occurs for each of the previously mentioned two sets of signal samples taken from the horizontal or vertical beam formers at positions $12a-12k$ or $13a-13k$. The highest peak in each new set of updated data is close to the highest peak in the previous set of data so a new, coarse global search is not performed on each new set of updated data. Instead $\alpha$ and $\beta$ values from the previous conjugate gradient search are used as the starting point for the conjugate gradient search on the new set of updated data. For computational efficiency or for real-time applications, an algorithm is used to update the eigenvalue decomposition code without solving the eigenvalue decomposition problem from the beginning again, i.e., an algorithm that makes use of the eigenvalue decomposition of the original covariance matrix. In numerical linear algebra, this problem is called the modified eigenvalue problem.

Conjugate gradient searching is well known in the prior art. See a book by W. H. Press, B. P. Flannery, S. A. Teukolsky and W. T. Vetterling, "Numerical Recipes", Cambridge University Press, Cambridge UK, 1986. It has been demonstrated that for certain types of functions, quadratic functions for example, the use of conjugate gradient direction processing allows convergence to a solution more quickly than the gradient direction. The standard conjugate gradient direction, when calculated at a given point, takes into account the direction of the previous step as well as the newly calculated gradient direction at the given point. If the direction of the step previously taken is designated by a vector B and the newly calculated gradient direction at the given point is designated as D, then the conjugate gradient direction at the given point is defined by the vector C in equation EQ 8 immediately below.

(EQ 8:) $C_{conj}=D+hB$

The conjugate gradient solutions used herein are based on numerical gradient derivatives of the equation shown equation EQ 6.

Returning to FIG. 3, there are three primary objectives for using the X antenna array design: (1) a robust design concept to reduce the probably of "wild" DF bearings under multipath conditions; (2) an accurate DF array that operates over a six to one ratio, maximum operating frequency to minimum operating frequency; and (3) an azimuth aperture to RF wavelength ratio that is greater or equal to 10.

The first objective is fulfilled by the fundamental X array design. First, there is a log periodic spacing between the antenna elements $12a$ through $12i$ and $13a-13i$ to minimize the effects of the array to "wild DF bearings". Second, the width dimension of the array is wider than the height dimension to yield better azimuth accuracy than elevation accuracy. Directly incident and sea surface reflected rays generate an interferometer pattern across the face of the antenna array. This interferometer pattern has horizontal symmetry and nulls will be observed as horizontal lines across the total face of the array. Conventional L shaped antenna arrays based on horizontal and vertical rows of antennas arrays are very susceptible to "wild DF bearings". If one antenna of the horizontal array is within a null, the whole horizontal array will be nulled, creating erroneous measurements and attendant DF errors. By contrast, X arrays have only a single pair of antennas exposed to common null regions. The other antennas of the X array continue to intercept strong signals and provide for accurate measurements, azimuth and elevation DF solutions.

The second objective is fulfilled by the two-band array design, each sub-band covering a maximum to minimum ratio of 3:1. The two-band array design achieves a total 6:1 maximum operating frequency to minimum operating frequency bandwidth.

The third objective is solved by the double X array design shown in FIG. 3. When the operating frequency is the geometric mean=square-root (maximum×minimum frequencies), each of these arrays has an azimuth aperture to wavelength ratio (Da/λ) equal to twenty. The elevation apertures are one third the dimension of the azimuth angle apertures. At the geometric mean operating frequency, the azimuth 3 dB beam width equals 2.4 degrees, while the elevation 3 dB beam width equals 7.0 degrees. DF solutions based on these large apertures will only be robust if the eleven element arrays are carefully designed as shown in FIG. 3. The eleven beam formed antennas of each array (12a-12k and 13a-13k) each have two diagonal rows of six beam formed elements that share a common central antenna element (12c, and 13c). Two orthogonally oriented antenna elements beam formers are installed at each of the eleven locations of each X array, one beam former designed for the reception of vertically polarized signals and the other beam former for the reception of horizontal polarized signals. Switching with antenna switch 14 is used to select the polarization that most nearly matches the incident electric field E(t) polarization. The six antennal locations along each leg of both the X-arrays 12 and 13 are chosen by using a logarithmic spacing that minimizes interferometer sidelobes. Broadside DF accuracy (standard-deviation) under zero scattered field conditions and a 20 dB Signal-to-Noise ratio is: azimuth=0.0346 degrees, elevation=0.1144 degrees.

Figure 10:
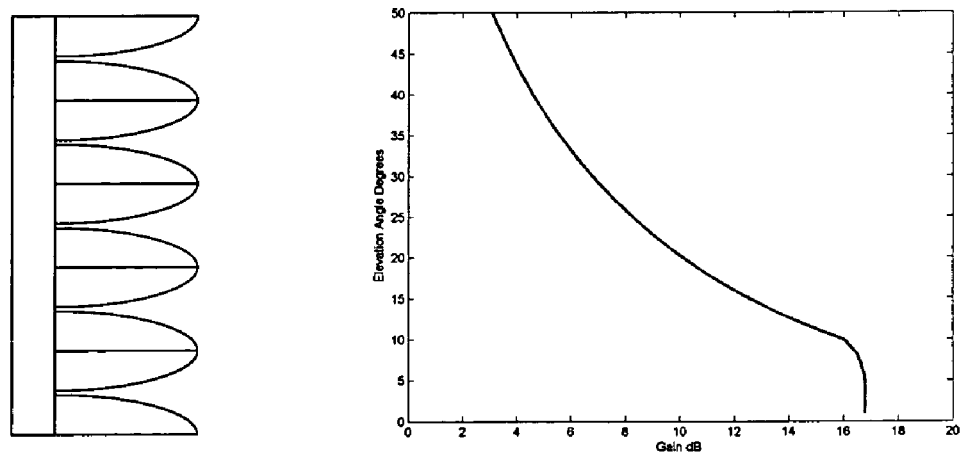
FIG. 10 shows five vertically polarized Vivaldi notch antennas connected to a vertically polarized beam former and the ideal beam pattern achieved thereby.

Each of the antenna elements of X array 12 and 13 are two sets of linearly polarized Vivaldi notch antennas connected to fixed beam formers. FIG. 10 shows five vertically polarized Vivaldi notch antennas connected to the vertically polarized beam former. This beam former is designed to generate cosecant squared beam shape with the peak of the formed beam pointed at the horizon. Horizontal Vivaldi antennas are installation to form horizontally polarized signal beam formers. The vertical and horizontal beam formers are computer selected during the measurement process. Ideally numerous measurements on the signal of interest (SOI) are recorded and inserted into the measured covariance matrix. The time duration of this process is limited by the amount of time needed for the target to move from beyond the specified DF accuracy. There is however a technique for summing correlation surfaces that reflect target movement during the measurement process, such as described in U.S. patent application Ser. No. 11/249,922, filed Oct. 13, 2005 and entitled "Moving Transmitter Correlation Interferometer Geolocation".

The Vivaldi notch antennas are a traveling wave antenna having exponentially tapered notches which open outwardly from a feed at the throat of the notch. Typically, in such a Vivaldi notch antenna there is a cavity behind the feed point which prevents energy from flowing back away from the feed point to the back end of the Vivaldi notch. As a result, in these antennas, one obtains radiation in the forward direction and obtains a single lobe beam over a wide frequency range. One can obtain a VSWR less than 3:1 with the beams staying fairly constant over the entire antenna bandwidth with the lobe having about an eighty degree or ninety degree beam width. The Vivaldi notch antennas are single lobe antennas having wide bandwidth and are unidirectional in that the beam remains relatively constant as a single lobe over a 6:1 bandwidth whether in elevation and in azimuth.

Vivaldi notch antennas were first described in a monograph entitled The Vivaldi Aerial by P. G. Gibson of the Phillips Research Laboratories, Redhill, Surrey, England in 1978 and by Ramakrishna Janaswamy and Daniel H. Schaubert in IEEE Transactions on Antennas and Propagation, vol. AP-35, no. 1, September 1987. The above article describes the Vivaldi aerial as a new member of the class of aperiodic continuously scaled antenna structures which has a theoretically unlimited instantaneous frequency bandwidth. This antenna was said to have significant gain and linear polarization that can be made to conform to constant gain versus frequency performance. One reported Gibson design had been made with approximately 10 dB gain and a minus −20 dB side lobe level over an instantaneous frequency bandwidth extending from below 2 GHz to about 40 GHz.

One Vivaldi notch antenna is described in U.S. Pat. No. 4,853,704 issued Aug. 1, 1989 to Leopold J. Diaz, Daniel B. McKenna, and Todd A. Pett. The Vivaldi notch has been utilized in micro strip antennas for some time and is utilized primarily in the high end of the electromagnetic spectrum as a wide bandwidth antenna element.

While what has been described herein is the preferred embodiment of the invention it will be appreciated by those skilled in the art that numerous changes may be made without departing from the spirit and scope of the invention.

The invention claimed is:

1. A method comprising determining the azimuth and elevation to an aircraft at long range and transmitting an electromagnetic signal while flying at a low altitude above water, wherein the signal is received using a plurality of vertically polarized antennas and horizontally polarized antennas in an antenna array, wherein the received signal is received directly from the aircraft and is received via multipath reflections from the surface of the water, wherein the azimuth and elevation to the aircraft are defined by a conjugate gradient based correlation search of covariance matrices containing the signals received by the vertically polarized antennas and the horizontally polarized antennas in digitized form representing the real and imaginary components of the received signal, and wherein the following equation is used to process the digitized information stored in the covariance matrices is searched to find the azimuth and elevation to the aircraft using the equation:

$$|R(\alpha,\beta)|^2 = \frac{\sum_{na=1}^{N}\left|\left\{\begin{array}{l}\rho_d \times A_{pol}(\alpha,\beta,na) + \rho_r \times \\ A_{pol}(-\alpha+\Delta\alpha,\beta+\Delta\beta,na)\end{array}\right\}^* \times U_{pol}(na)\right|^2}{\sum_{na=1}^{N}\left|\left\{\begin{array}{l}\rho_d \times A_{pol}(\alpha,\beta,na) + \rho_r \times \\ A_{pol}(-\alpha+\Delta\alpha,\beta+\Delta\beta,na)\end{array}\right\}\right|^2 \times \sum_{na=1}^{N}|U_{pol}(na)|^2}$$

where $|R(\alpha,\beta)|^2$ is the correlation squared and the maximum value is searched for during the conjugate gradient based correlation search, $\alpha$ is the elevation angle to the aircraft transmitting the signal, $\beta$ is the azimuth angle to the aircraft transmitting the signal, $\rho_d$ is the direct complex coefficient, $\rho_r$ is the reflected complex coefficient, * is a complex conjugate, na is the number of antennas in the beam forming array utilized to receive the signals transmitted by the aircraft, $A_{pol}$ are calibration vectors as a function of $\alpha$ and $\beta$, and $U_{pol}$ is the eigenvector resolved received signal vector and is composed of the directly received signal component and the reflected signal component and is equal the sum of the eigenvectors of the signals from the vertically polarized antennas and the horizontally polarized antennas.

2. The method for determining the azimuth and elevation to an aircraft of claim 1 wherein the signals received using the plurality of vertically polarized antennas are digitized and stored in a first covariant matrix, and the signals received using the plurality of horizontally polarized antennas are digitized and stored in a second covariant matrix;

wherein the first covariant matrix undergoes eigenspace decomposition to produce a first set of signal array eigenvectors U having first eigenvalues;

wherein the second covariant matrix undergoes eigenspace decomposition to produce a second set of signal array eigenvectors U having second eigenvalues;

wherein the first eigenvalues are compared to the second eigenvalues and the received electromagnetic signal is vertically polarized if the first eigenvalues are greater than the second eigenvalues, and is horizontally polarized if the first eigenvalues are less than the second eigenvalues; and wherein the eigenvector with the associated highest eigenvalues are used to perform the conjugate gradient based correlation search.

3. The method for determining the azimuth and elevation to an aircraft of claim 2 wherein before a conjugate gradient based correlation search is performed using said equation to determine the azimuth and elevation to the aircraft, a global correlation search is performed using said equation but the terms $\Delta\alpha$ and $\Delta\beta$ in the equation are set equal to zero and it is assumed that mirror reflection conditions for reflection of the electromagnetic signal from the surface of the water, the result obtained using said equation are approximate values for elevation $\alpha$ and azimuth $\beta$ to the aircraft, the approximate values then being used as the starting point in the conjugate gradient based correlation search using said equation.

4. The method for determining the azimuth and elevation to an aircraft of claim 3 wherein the maximization of the term $|R(\alpha,\beta)|^2$ over $\rho_d$, $\rho_r$ is achieved by a observing that $|R(\alpha,\beta)|^2$ can be the ratio of quadratic forms in closed form when the numerator of said equation is defined as equal to $$|\rho_d|^2 \times \left|\sum_{na=1}^{N} \{A(\alpha, \beta, na)^* \times U(na)\}\right|^2 +$$

$$\rho_d^* \times \rho_r \times \sum_{na=1}^{N} \{A(\alpha, \beta, na)^* \times U(na)\} \times$$

$$\sum_{na=1}^{N} \{A(-\alpha + \Delta\alpha, \beta + \Delta\beta, na)^* \times U(na)\}^* +$$

$$\rho_d \times \rho_r^* \times \sum_{na=1}^{N} \{A(\alpha, \beta, na)^* \times U(na)\}^* \times$$

$$\sum_{na=1}^{N} \{A(-\alpha + \Delta\alpha, \beta + \Delta\beta, na)^* \times U(na)\} +$$

$$|\rho_r|^2 \times \left|\sum_{na=1}^{N} \{A(-\alpha + \Delta\alpha, \beta + \Delta\beta, na)^* \times U(na)\}\right|^2$$

and the denominator of said equation is defined as equal to $$\sum_{na=1}^{N} |U(na)|^2 \times \left\{|\rho_d|^2 \times \sum_{na=1}^{N} |A(\alpha, \beta, na)|^2 + \right.$$

$$\rho_d^* \times \rho_r \times \sum_{na=1}^{N} (A(\alpha, \beta, na)^* \times A(-\alpha + \Delta\alpha, \beta + \Delta\beta, na)) +$$

$$\rho_d \times \rho_r^* \times \sum_{na=1}^{N} (A(\alpha, \beta, na) \times A(-\alpha + \Delta\alpha, \beta + \Delta\beta, na)^*) +$$

$$\left. |\rho_r|^2 \times \sum_{na=1}^{N} |A(-\alpha + \Delta\alpha, \beta + \Delta\beta, na)|^2 \right\}$$

and the closed form maximization process is further simplified by letting H and G terms be defined as $$H_{11} = \left|\sum_{na=1}^{N} \{A(\alpha, \beta, na)^* \times U(na)\}\right|^2$$

$$H_{12} = \sum_{na=1}^{N} \{A(\alpha, \beta, na)^* \times U(na)\} \times$$

$$\sum_{na=1}^{N} \{A(-\alpha + \Delta\alpha, \beta + \Delta\beta, na) \times U(na)^*\}$$

$$H_{21} = \sum_{na=1}^{N} \{A(\alpha, \beta, na)^* \times U(na)\}^* \times$$

$$\sum_{na=1}^{N} \{A(-\alpha + \Delta\alpha, \beta + \Delta\beta, na)^* \times U(na)\}$$

$$H_{22} = \left|\sum_{na=1}^{N} \{A(-\alpha + \Delta\alpha, \beta + \Delta\beta, na)^* \times U(na)\}\right|^2$$

$$G_{11} = \sum_{na=1}^{N} |U(na)|^2 \times \sum_{na=1}^{N} |A(\alpha, \beta, na)|^2$$

$$G_{12} = \sum_{na=1}^{N} |U(na)|^2 \times \sum_{na=1}^{N} (A(\alpha, \beta, na)^* \times A(-\alpha + \Delta\alpha, \beta + \Delta\beta, na))$$

$$G_{21} = G_{12}^*$$

$$G_{22} = \sum_{na=1}^{N} |U(na)|^2 \times \sum_{na=1}^{N} |A(-\alpha + \Delta\alpha, \beta + \Delta\beta, na)|^2,$$

then the G and H terms are inserted into said equation to get a revised equation $$|R(\alpha, \beta)|^2 = \frac{|\rho_d|^2 \times H_{11} + \rho_d^* \times \rho_r \times H_{12} + \rho_d \times \rho_r^* \times H_{21} + |\rho_r|^2 \times H_{22}}{|\rho_d|^2 \times G_{11} + \rho_d^* \times \rho_r \times G_{12} + \rho_d \times \rho_r^* \times G_{21} + |\rho_r|^2 \times G_{22}}$$

where the characteristic equation of Hermitian forms $[H-\gamma G]=0$ and the largest root of this equation is the maximum of the ratio of Hermitian forms is $$\gamma_{max} = \text{maximum of} \left(\frac{H(x, y)}{G(x, y)}\right);$$

where $|R(\alpha,\beta)|^2$ has this form and the maximum value of $|R(\alpha,\beta)|^2$ at angles $\alpha$, $\beta$, $-\alpha+\Delta\alpha$, and, $\beta+\Delta\beta$ is the solution to the determinant equation $$\begin{bmatrix} H_{11} - \gamma_{max} \times G_{11} & H_{12} - \gamma_{max} \times G_{12} \\ H_{21} - \gamma_{max} \times G_{21} & H_{22} - \gamma_{max} \times G_{22} \end{bmatrix}$$

where this determinant equation is solved by the quadratic equation $$a \times \gamma_{max}^2 + b \times \gamma_{max} + c = 0$$

$$a = G_{11} \times G_{22} + |G_{12}|^2$$

$$b = -(H_{11} \times G_{22} + H_{22} \times G_{11}) + (H_{12} \times G_{21} + H_{21} \times G_{12})$$

$$c = H_{11} \times H_{22} - H_{12} \times H_{21} = 0$$

and the maximum value of $|R(\alpha,\beta)|^2$ is therefore $$\max(|R(\alpha,\beta)|^2) = \gamma_{max} = -\frac{b}{a}.$$

* * * * *